DIFFERENTIAL AMPLIFIER AND NULL DETECTOR

Filed Sept. 27, 1965

INVENTORS
Kenneth D. Wright
Anthony G. Clor, Jr.
BY
Harness, Dickey & Pierce
ATTORNEYS.

United States Patent Office 3,496,384

Patented Feb. 17, 1970

3,496,384

DIFFERENTIAL AMPLIFIER AND NULL DETECTOR

Kenneth D. Wright, Pontiac, and Anthony G. Clor, Jr., Utica, Mich., assignors to Design Products Corporation, Troy, Mich., a corporation of Michigan Filed Sept. 27, 1965, Ser. No. 490,587

Int. Cl. H03k *5/20*

U.S. Cl. 307—235 12 Claims

ABSTRACT OF THE DISCLOSURE

A differential amplifier including a resistance bridge circuit defined by four resistive portions connected as a bridge and having a pair of input terminals for connection to a source of direct potential and a pair of output terminals with the differential amplifier being connected across the output terminals whereby a first signal will be provided in response to a potential of one polarity occurring at the output terminals and a second signal will be provided in response to a difference in potential of opposite polarity occurring at the output terminals.

The present invention relates to null detector circuits.

It is an object of the present invention to provide an improved, simplified null detector circuit.

It is another object of the present invention to provide an inexpensive null detector circuit using solid state components.

It is still another object of the present invention to provide an improved null detector circuit capable either of putting out a single signal in a non-null situation or separate signals depending on which side of zero the non-null situation occurs.

Figure 1:
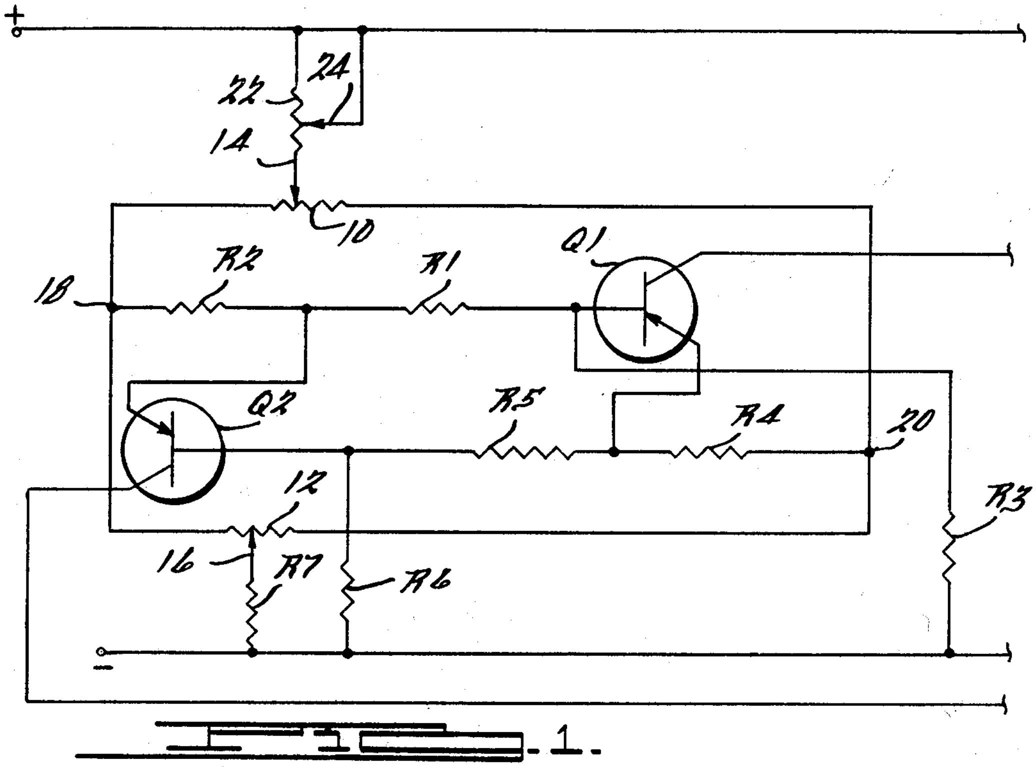
Figure 2:
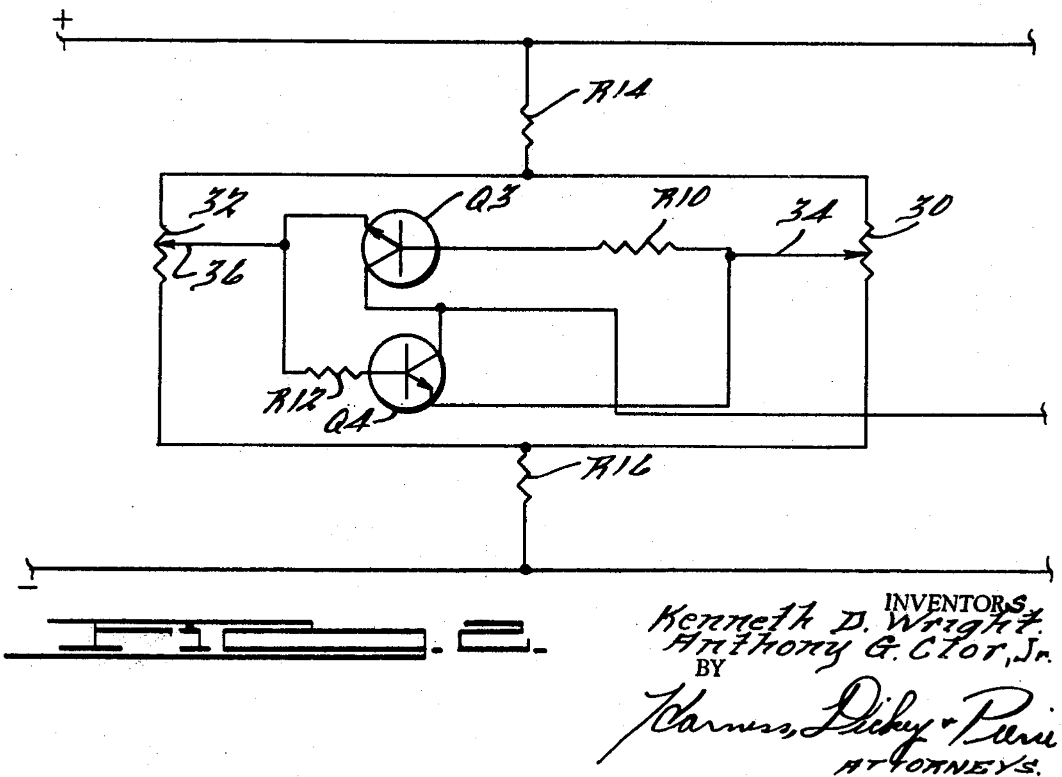

Other objects, features, and advantages of the present invention will become apparent from the subsequent description and the appended claims, taken in conjunction with the accompanying drawings, in which:

FIGURE 1 is an electrical schematic diagram of a preferred form of the present invention; and FIGURE 2 is an electrical schematic diagram of the modified form of the present invention.

While the circuit of the present invention is capable of use in a variety of applications it will be generally described for use in a servo system. Looking now to the drawing the circuit includes a command potentiometer 10 and a feedback potentiometer 12 which are parallelly connected to form a bridge with the wipers 14 and 16 of potentiometers 10 and 12, respectively, being connected to the positive and negative terminals, respectively, of a direct voltage source. A first p-n-p transistor Q1 has its base connected to one juncture 18 between potentiometers 10 and 12 via a pair of serially connected biasing resistors R1 and R2 which form a voltage dividing biasing network with a resistor R3 which is connected directly between the base and the negative terminal of the source. The emitter of transistor Q1 is connected to the other juncture 20 between potentiometers 12 and 14 via a biasing resistor R4. The resistor R4 forms a part of a base biasing circuit for a second p-n-p transistor Q2 and is connected to its base via a bias resistor R5; resistors R4 and R5 form a voltage dividing biasing network with a resistor R6 which is connected directly between the base of transistor Q2 and the negative terminal. The emitter of transistor Q2 is connected between resistors R1 and R2 and hence is connected to the juncture 18 via the resistor R2.

Separate outputs can be taken from the collectors of transistors Q1 and Q2 or the two collectors could be connected and a single output could be provided. In either case subsequent amplification could be provided as required. Assuming now that the wiper 14 of the command potentiometer 10 has been set at a selected position, for a null condition to exist the wiper 16 of potentiometer will have to be in a position such that the difference in potential across junctures 18 and 20 is substantially zero. Under this condition there will be no current flow in the base-emitter circuits of transistors Q1 and Q2 and hence there will be no current flow in the output or emitter-collector circuits of transistors Q1 and Q2.

If a non-null or unbalance condition exists then one or the other of the transistors Q1, Q2 will conduct, depending upon the direction of the unbalance. For example, if the juncture 18 is positive relative to juncture 20, then transistor Q1 will be maintained non-conductive but transistor Q2 will be rendered conductive. Conversely, if juncture 18 is negative relative to juncture 20, then transistor Q2 will be maintained non-conductive and transistor Q1 will be rendered conductive. Note only one of the transistors Q1, Q2 will conduct at a time with the conducting transistor having a positive potential signal at its collector.

Considering now a servo type application with the wiper 14 of command potentiometer 10 set in a selected position, if an unbalance occurs to move the wiper 14, then either Q1 or Q2 will conduct, depending upon the direction of the unbalance, i.e., juncture 18 being either positive or negative relative to juncture 20. The wiper 16 can be connected to a slave drive mechanism which operates from circuitry response to the output of transistor Q1 or Q2 whereby the wiper 16 is moved in one direction towards null if transistor Q1 conducts and in an opposite direction towards null if transistor Q2 conducts. Apparatus could be provided whereby the drive mechanism would be deenergized upon attainment of a null balance.

Note that the circuitry is simple and for sensing unbalance in both directions requires only two transistors. Unlike convensional differential type amplifiers used in similar applications, the transistors Q1 and Q2 need not have identical operating characteristics; this is because in any single non-null condition only one of the transistors Q1 or Q2 will be conducting. This factor gives another advantage in that in some applications only the occurrence and not the polarity of unbalance is required to be sensed; in such an application the two collectors can be connected together and a single output utilized. In the latter type of application only one subsequent amplifier circuit would be required.

Still in other applications it may be required to sense a non-null condition occurring only on one side of zero; in this case only one of the transistors Q1, Q2 could be utilized.

In many applications it is desirable that the sensitivity of the apparatus be decreased such that a null will be indicated over a range of settings of the feedback potentiometer 12 relative to a selected setting of the command potentiometer 10. This is accomplished by use of a variable resistor 22 which is connected between the wiper 14 of command potentiometer 10 and the positive terminal of the source. Thus by varying the setting of the wiper 24 of variable resistor 22 the width or the range of null balance of the circuit can be selectively varied to accommodate the requirements of various applications. A resistor R7 is a dropping resistor connected from the wiper 16 of feedback potentiometer 12 to the negative terminal of the source to drop the operating potential to a preselected value.

FIGURE 2 depicts a modified form of the circuit of FIGURE 1 which operates in a similar manner. Briefly, in FIGURE 2 a pair of n-p-n transistors Q3 and Q4 are connected across a bridge defined by command and feedback potentiometers 30 and 32, respectively. The wiper 34 of command potentiometer 30 is connected to the emitter of transistor Q4 and to the base of transistor Q3 through bias resistor R10. The wiper 36 of feedback potentiometer 32 is connected to the emitter of transistor Q3 and to the base of transistor Q4 through bias resistor R12. Opposite ends of potentiometers 30 and 32 are connected to positive and negative terminals of a direct potential source via dropping resistors R14 and R16, respectively. When the potential difference between wipers 34 and 36 is zero the bridge is balanced and neither transistor Q3 nor Q4 will conduct; if wiper 36 becomes positive relative to wiper 34, Q4 will conduct and if wiper 34 becomes positive relative to wiper 36, Q3 will conduct. In either case of conduction the result is a negative potential signal at the appropriate collector and hence at the conductors connecting the two collectors.

As shown, the collectors of transistors Q3 and Q4 are connected together and a single output is provided for non-null conditions on opposite sides of zero. The collectors could be connected to separate circuits to provide indication of the polarity of the unbalance; also for certain applications requiring an indication of unbalance in one direction only, a single transistor will suffice.

With both embodiments an inexpensive, versatile circuit has been shown which can be adapted to accommodate a great many applications now requiring more complex and more expensive circuitry.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a resistance bridge circuit defined by four resistive portions connected as a bridge and having a pair of input terminals adapted to be connected to a source of direct potential and a pair of output terminals, the improvement comprising: a transistor having base, collector and emitter electrodes, first circuit means electrically connecting said emitter to one of the output terminals and second circuit means electrically connecting said base to the other of the output terminals whereby an output signal will be provided at said collector in response to a difference in potential of one polarity occurring at the output terminals, a second transistor having base, collector and emitter electrodes, third circuit means electrically connecting said emitter of said second transistor to the other of the output terminals and fourth circuit means electrically connecting said base to the first of the output terminals whereby a second output signal will be provided at said second collector in response to a difference in potential of a polarity opposite to said one polarity occurring at the output terminals.

2. The circuit of claim 1 in which said collectors of said transistor and second transistor are electrically connected together.

3. A control circuit comprising a bridge circuit having four electrical impedance elements connected as a bridge and having a pair of input terminals adapted to be connected to a source of potential and a pair of output terminals, a transistor having base, collector and emitter electrodes, first circuit means electrically connecting said emitter to one of the output terminals and second circuit means electrically connecting said base to the other of the output terminals for providing an output signal at said collector in response to a difference in potential of one polarity occurring at the output terminals.

4. The circuit of claim 3 further including a variable resistance connected between one polarity of the source of potential and the associated one of the input terminals whereby the range over which said signal will be provided can be selectively varied.

5. A control circuit comprising: a command potentiometer having three terminals defined by two ends of a resistance element and a movable wiper, a slave potentiometer having three terminals defined by two ends of a resistance element and a movable wiper, circuit means connecting said three terminals of said command and slave potentiometers into a bridge network having a pair of input terminals and a pair of output terminals with said input terminals adapted to be connected across a direct potential and with the potential across said output terminals being varied in accordance with variations in the positions of said movable wipers, a transistor having base, collector and emitter electrodes, first circuit means electrically connecting said emitter to one of the output terminals and second circuit means electrically connecting said base to the other of the output terminals whereby an output signal will be provided at said collector in response to a difference in potential of one polarity occurring at the output terminals.

6. The circuit of claim 5 further including a variable resistance connected between one polarity of the source of potential and the associated one of the input terminals whereby the range over which said signal will be provided can be selectively varied.

7. A control circuit comprising: a command potentiometer having three terminals defined by two ends of a resistance element and a movable wiper, a slave potentiometer having three terminals defined by two ends of a resistance element and a movable wiper, circuit means connecting said three terminals of said command and slave potentiometer into a bridge network having a pair of input terminals and a pair of output terminals with said input terminals adapted to be connected across a direct potential and with the potential across said output terminals being varied in accordance with variations in the positions of said movable wipers, a transistor having base, collector and emitter electrodes, first circuit means electrically connecting said emitter to one of the output terminals and second circuit means electrically connecting said base to the other of the output terminals whereby an output signal will be provided at said collector in response to a difference in potential of one polarity occurring at the output terminals, a second transistor having base, collector and emitter electrodes, third circuit means electrically connecting said emitter of said second transistor to the other of the output terminals and fourth circuit means electrically connecting said base to the first of the output terminals whereby a second output signal will be provided at said second collector in response to a difference in potential of a polarity opposite to said one polarity occurring at the output terminals.

8. The circuit of claim 6 in which said collectors of said transistor and second transistors are electrically connected together.

9. A control circuit comprising a resistance bridge circuit having four electrical impedance elements connected as a bridge and having a pair of input terminals adapted to be connected to a source of direct potential and a pair of output terminals, switch means for providing a closed circuit when a potential difference appears across the output terminals, said switch means including potential sensing means for sensing the potential difference across the output terminals and circuit means responsive to said sensing means sensing a potential difference for providing said closed circuit.

10. A control circuit comprising: a command potentiometer having a resistance element and a movable wiper, a slave potentiometer having a resistance element and a movable wiper, circuit means connecting said resistance elements of said command and slave potentiometers in parallel with each said movable wiper adapted to be connected across a direct potential whereby the potential across the junctures of said resistance elements will be varied in accordance with variations in the positions of said movable wipers, a transistor having base, collector and emitter electrodes, first circuit means electrically connecting said emitter to one of said junctures and second circuit means electrically connecting said base to the other of said junctures whereby an output signal will be provided as said collector in response to a difference in potential of one polarity occurring at said juncture.

11. A control circuit comprising: a command potentiometer having three terminals defined by two ends of a a slave potentiometer having a resistance element and a movable wiper, circuit means connecting said resistance elements of said command and slave potentiometers in parallel with the junctures of said resistance elements adapted to be connected across a direct potential whereby the potential across said wipers will be varied in accordance with variations in the positions of said movable wipers, a transistor having base, collector and emitter electrodes, first circuit means electrically connecting said emitter to one of said wipers and second circuit means electrically connecting said base to the other of said wipers whereby an output signal will be provided at said collector in response to a difference of one polarity occurring at said wiper.

12. A control circuit comprising: a command potentiometer having three terminals defined by two ends of a resistance element and a movable wiper, a slave potentiometer having three terminals defined by two ends of a resistance element and a movable wiper, circuit means connecting said three terminals of said command and slave potentiometer into a bridge network having a pair of input terminals and a pair of output terminals with said input terminals adapted to be connected across a direct potential and with the potential across said output terminals being varied in accordance with variations in the positions of said movable wipers, switch means for providing a closed circuit when a potential difference appears across said output terminals, said switch means including potential sensing means for sensing the potential difference across said output terminals and circuit means responsive to said sensing means sensing a potential difference for providing said closed circuit.

References Cited

UNITED STATES PATENTS

| | | | |
|---|---|---|---|
| 2,921,234 | 1/1960 | Henquet. | |
| 3,066,297 | 11/1962 | Adams et al. | 324—100 XR |
| 3,210,617 | 10/1965 | Kruper | 307—315 XR |
| 3,283,244 | 11/1966 | Proctor et al. | 307—315 XR |

DONALD D. FORRER, Primary Examiner

STANLEY T. KRAWCZEWICZ, Assistant Examiner

U.S. Cl. X.R.

307—236; 318—28; 324—99; 328—147; 330—69; 340—187

UNITED STATES PATENT OFFICE

CERTIFICATE OF CORRECTION

Patent No. 3,496,384 February 17, 1970

Kenneth D. Wright et al.

It is certified that error appears in the above identified patent and that said Letters Patent are hereby corrected as shown below:

Column 1, line 39, "comjunc-" should read -- conjunc- --. Column 2, line 4, after "of" insert -- feedback --; line 40, "convensional" should read -- conventional --. Column 5, lines 8 and 9, after "having" cancel "three terminals defined by two ends of a slave potentiometer having" and insert in line 10, after "wiper," -- a slave potentiometer having a resistance element and a movable wiper, --; line 21, after "difference" insert -- in potential --.

Signed and sealed this 21st day of July 1970.

(SEAL)

Attest:

Edward M. Fletcher, Jr.

Attesting Officer

WILLIAM E. SCHUYLER, JR.

Commissioner of Patents